US010589201B2

(12) United States Patent
Larsson

(10) Patent No.: US 10,589,201 B2
(45) Date of Patent: Mar. 17, 2020

(54) FRAME-TYPE DISC FILTER WITH BYPASS WATER CONTROL FOR PREVENTING BYPASS WATER FROM BEING USED IN BACKWASHING

(71) Applicants: Per Larsson, Trelleborg (SE); Veolia Water Solutions & Technologies Support, Saint-Maurice (FR)

(72) Inventor: Per Larsson, Trelleborg (SE)

(73) Assignee: Veolia Water Solutions & Technologies Support, Saint-Maurice (FR)

(*) Notice: Subject to any disclaimer, the term of this patent is extended or adjusted under 35 U.S.C. 154(b) by 0 days.

(21) Appl. No.: 16/332,908

(22) PCT Filed: Sep. 19, 2017

(86) PCT No.: PCT/IB2017/055662
§ 371 (c)(1),
(2) Date: Mar. 13, 2019

(87) PCT Pub. No.: WO2018/060809
PCT Pub. Date: Apr. 5, 2018

(65) Prior Publication Data
US 2019/0255468 A1  Aug. 22, 2019

Related U.S. Application Data

(60) Provisional application No. 62/400,784, filed on Sep. 28, 2016.

(51) Int. Cl.
*B01D 33/13* (2006.01)
*B01D 33/21* (2006.01)
(Continued)

(52) U.S. Cl.
CPC .............. *B01D 33/13* (2013.01); *B01D 33/11* (2013.01); *B01D 33/21* (2013.01); *B01D 33/50* (2013.01);
(Continued)

(58) Field of Classification Search
None
See application file for complete search history.

(56) References Cited

U.S. PATENT DOCUMENTS 5,707,512 A    1/1998  Koch et al.
9,878,271 B2   1/2018  Gaudfrin
(Continued)

FOREIGN PATENT DOCUMENTS

GB         1313403 A       4/1973
KR     20110020458 A       3/2011
(Continued)

OTHER PUBLICATIONS

RU Search Report dated Nov. 27, 2019 in re RU Application No. 2019112685 filed Apr. 25, 2019.

*Primary Examiner* — Robert J Popovics
(74) *Attorney, Agent, or Firm* — Coats & Bennett PLLC

(57) ABSTRACT

A frame-type disc filter (100) is provided with a bypass water collector (33) disposed adjacent an inlet to the disc filter. Influent water overflows the inlet into the bypass water collector. A conduit is communicatively connected to the bypass water collector for directing the bypass water from the frame-type disc filter to an effluent channel that is independent of the frame-type disc filter.

4 Claims, 5 Drawing Sheets

(51) Int. Cl.
*B01D 33/50* (2006.01)
*B01D 33/80* (2006.01)
*B01D 33/11* (2006.01)

(52) U.S. Cl.
CPC ...... *B01D 33/803* (2013.01); *B01D 2201/325* (2013.01); *B01D 2201/48* (2013.01)

(56) References Cited

U.S. PATENT DOCUMENTS

| | | | |
|---|---|---|---|
| 2012/0325753 A1 | 12/2012 | Baker et al. | |
| 2017/0157540 A1 | 6/2017 | Svensson et al. | |
| 2019/0255468 A1* | 8/2019 | Larsson | B01D 33/13 |
| 2019/0314743 A1* | 10/2019 | Jibert | B01D 33/21 |

FOREIGN PATENT DOCUMENTS

| | | |
|---|---|---|
| RU | 2080155 C1 | 5/1997 |
| RU | 2350734 C2 | 3/2009 |
| RU | 2579393 C2 | 4/2016 |
| WO | 2014078269 A1 | 5/2014 |

\* cited by examiner

FRAME-TYPE DISC FILTER WITH BYPASS WATER CONTROL FOR PREVENTING BYPASS WATER FROM BEING USED IN BACKWASHING

RELATED APPLICATIONS

The present application is a U.S. National Stage Application of PCT Application No. PCT/IB2017/055662, with an international filing date of Sep. 19, 2017. Applicant claims priority based on U.S. Patent Application No. 62/400,784 filed Sep. 28, 2016. The subject matter of these applications is incorporated herein in their entirety.

FIELD OF THE INVENTION

The present invention relates to rotary disc filters for filtering water, and more particularly to frame-type disc filters that are typically supported on a concrete structure that includes a basin for receiving filtered water produced by the disc filter.

BACKGROUND OF THE INVENTION

Rotary disc filters are used to remove suspended solids from water. Influent water flows into a drum and from the drum into a series of disc-shaped filter members secured around the drum. From the disc-shaped filter members, the water flows outwardly through filter media disposed on opposite sides of the disc-shaped filter members. Suspended solids in the water are captured on the interior surfaces of the filter media. From time-to-time, the suspended solids are removed from the interior surfaces of the filter media. This is achieved by rotating the filter media to an upper cleaning position and backwashing the filter media. A pressurized backwash is sprayed onto the exterior surfaces of the filter media, discharging the suspended solids into a trough disposed in the drum. The suspended solids are then discharged from the trough and the disc filter.

To control head pressure in the disc filter, some of the influent water may be diverted from the drum and the disc-shaped filter members. This diverted water is referred to as bypass water. Frame-type disc filters are typically supported on a concrete structure that includes a built-in basin for receiving filtered water. In some cases, the bypass water overflows the inlet to the disc filter into the basin. This presents a backwash problem. Filtered water collected in the basin of the underlying support structure is typically used for the backwash. It is appreciated that the bypass water is unfiltered and hence includes suspended solids. Therefore, when the bypass water is mixed with the filtered water and this mixture is used to backwash the filter media, it is appreciated that the suspended solids in the backwash tends to clog upstream strainers that are employed to protect the backwash nozzles. In other cases, the backwash water is directly discharged from the disc filter. That is, the bypass water is separately discharged from the disc filter without combining the bypass water with the filtrate in the basin of the support structure. This is often an expensive solution that is disfavored by end users. In order to implement this solution, one must provide a separate pipe or another concrete channel in order to channel the bypass water downstream of the disc filter where the bypass water can be mixed with the disc filter effluent or filtered water.

Therefore, there has been and continues to be a need for a practical and cost effective way of handling bypass water in frame-type disc filters.

SUMMARY OF THE INVENTION

The present invention relates to a frame-type disc filter. A frame-type disc filter does not include an integral tank for collecting filtered water. Instead, the frame-type disc filter is configured to be supported on a support structure (typically a concrete support structure) that includes a basin and an effluent discharge channel. Filtrate from the frame-type disc filter falls into the basin and then flows into the effluent channel which directs the filtrate away from the disc filter and support structure. In one embodiment, the frame-type disc filter of the present invention is provided with a bypass water collector disposed adjacent an inlet that directs water to be filtered into the disc filter. In some situations, influent water overflows the inlet into the bypass water collector disposed adjacent the inlet. A conduit or outlet is communicatively connected to the bypass water collector for directing the bypass water from the frame-type disc filter into the effluent channel. Filtered water collected in the basin is utilized by the backwashing system of the disc filter to clean the filter media. Thus, the water used to backwash the filter media is not contaminated with suspended solids found in the bypass water.

Other objects and advantages of the present invention will become apparent and obvious from a study of the following description and the accompanying drawings which are merely illustrative of such invention.

DESCRIPTION OF EXEMPLARY EMBODIMENTS

Figure 1:
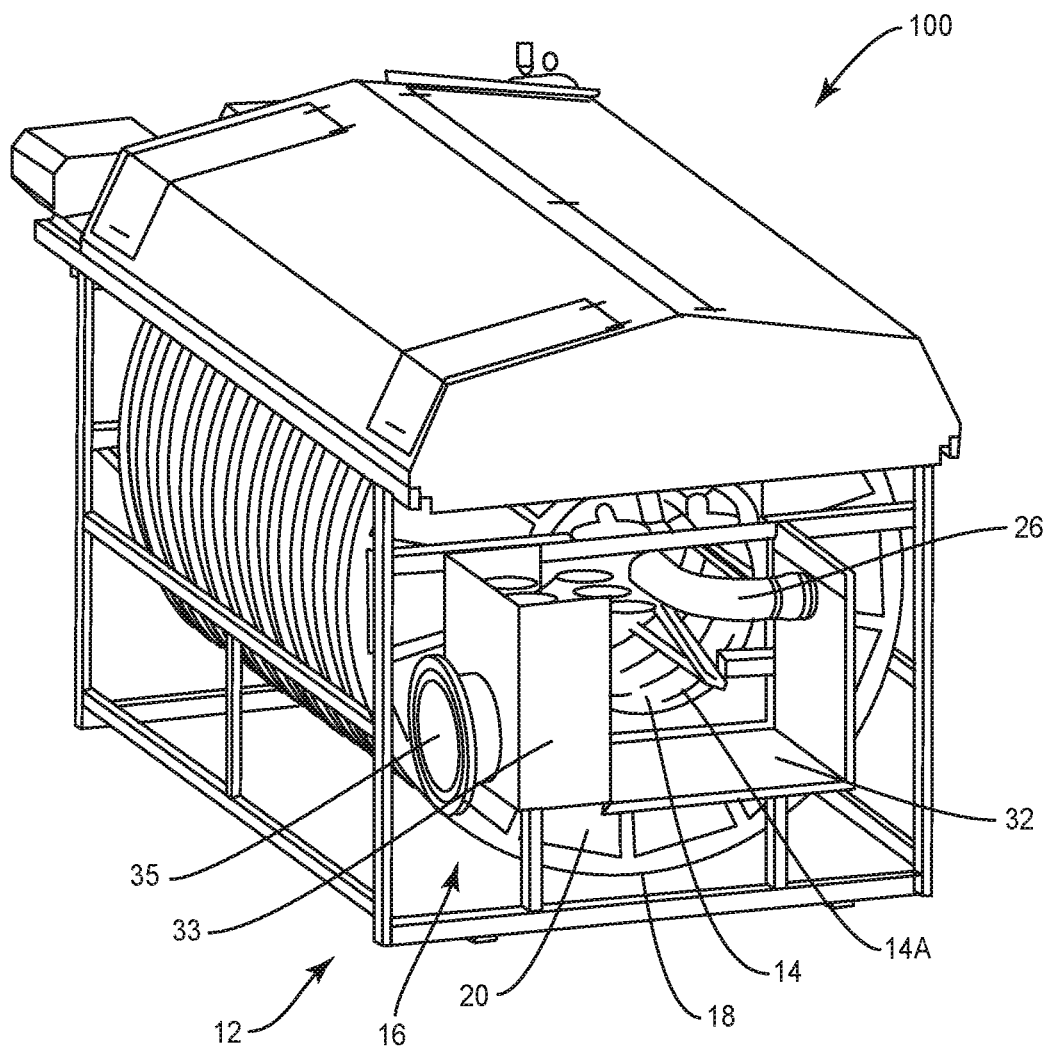
FIG. 1 is a perspective view of the frame-type disc filter of the present invention and which shows the inlet end and a side of the disc filter.
Figure 2:
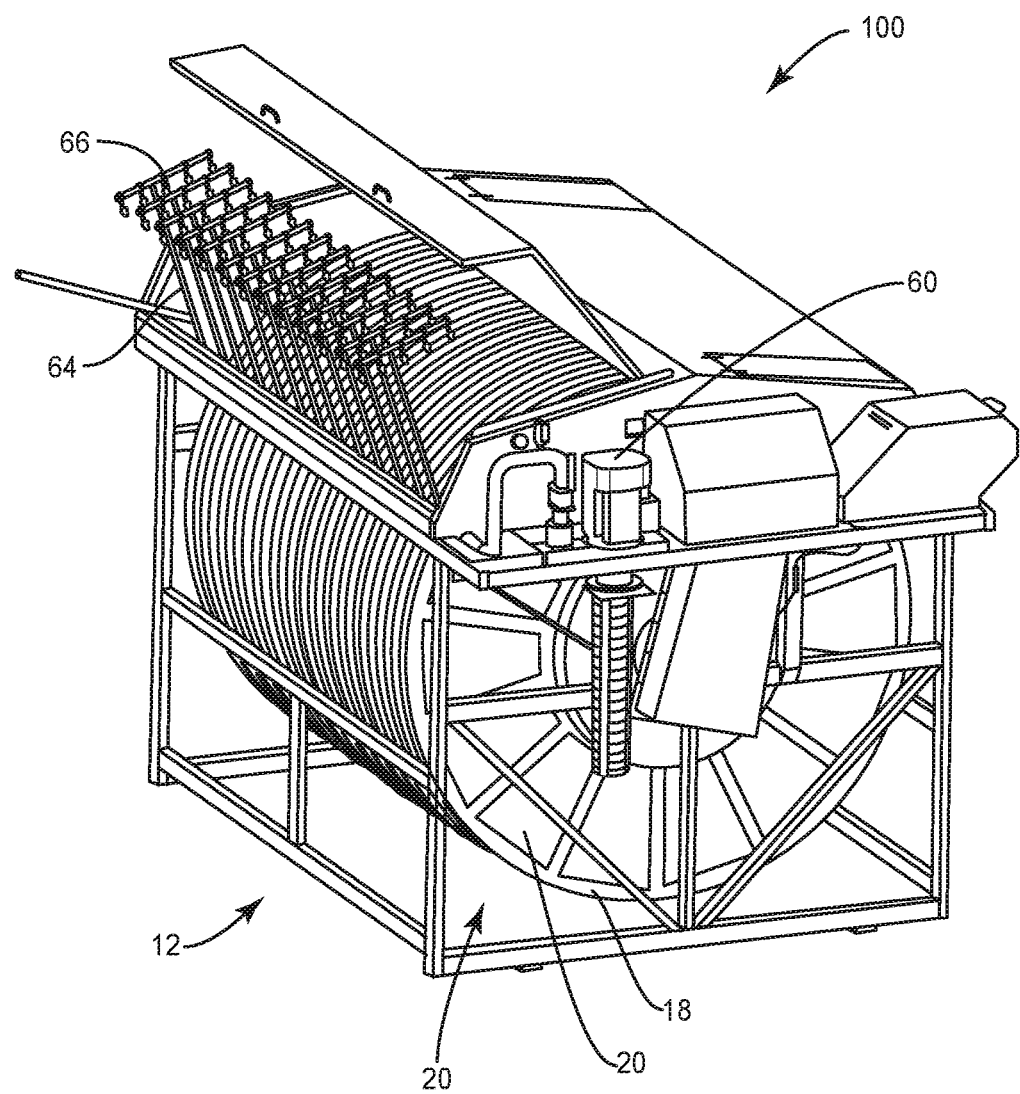
FIG. 2 is another perspective view of the frame-type disc filter showing the rear end of the disc filter and the other side thereof.
Figure 3:
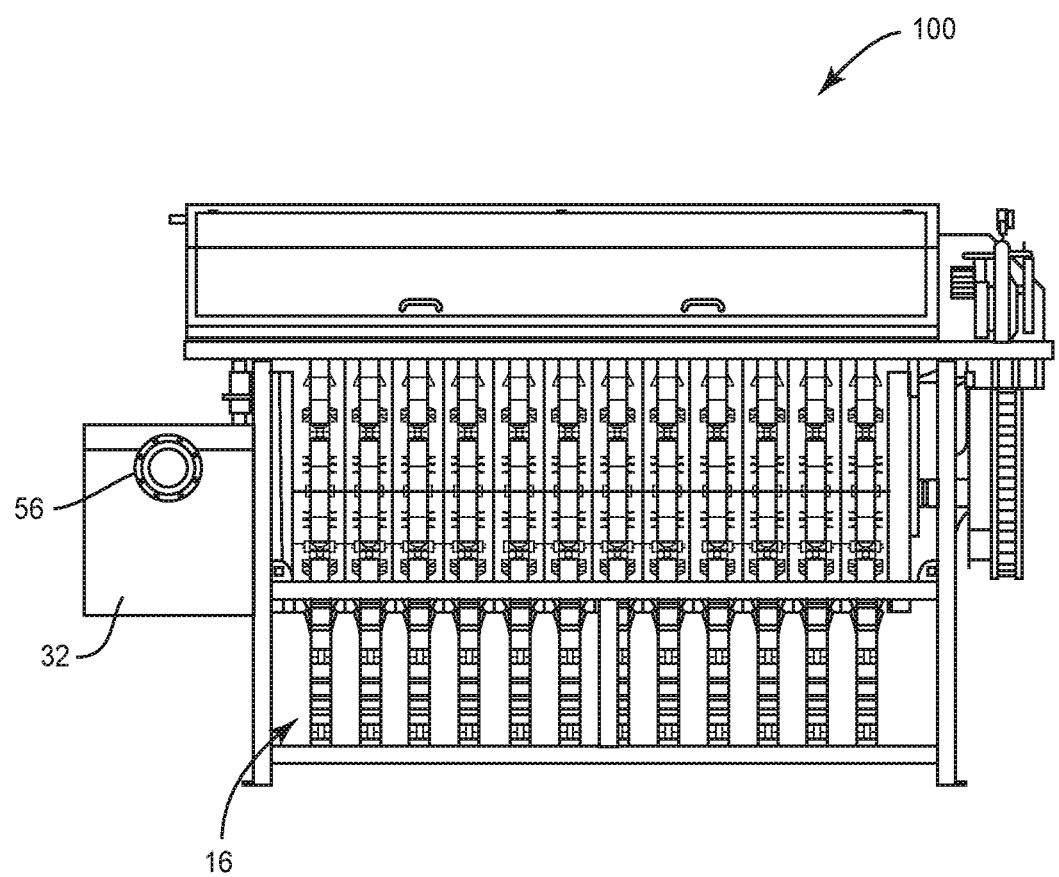
FIG. 3 is a side elevational view of the frame-type disc filter.
Figure 6:
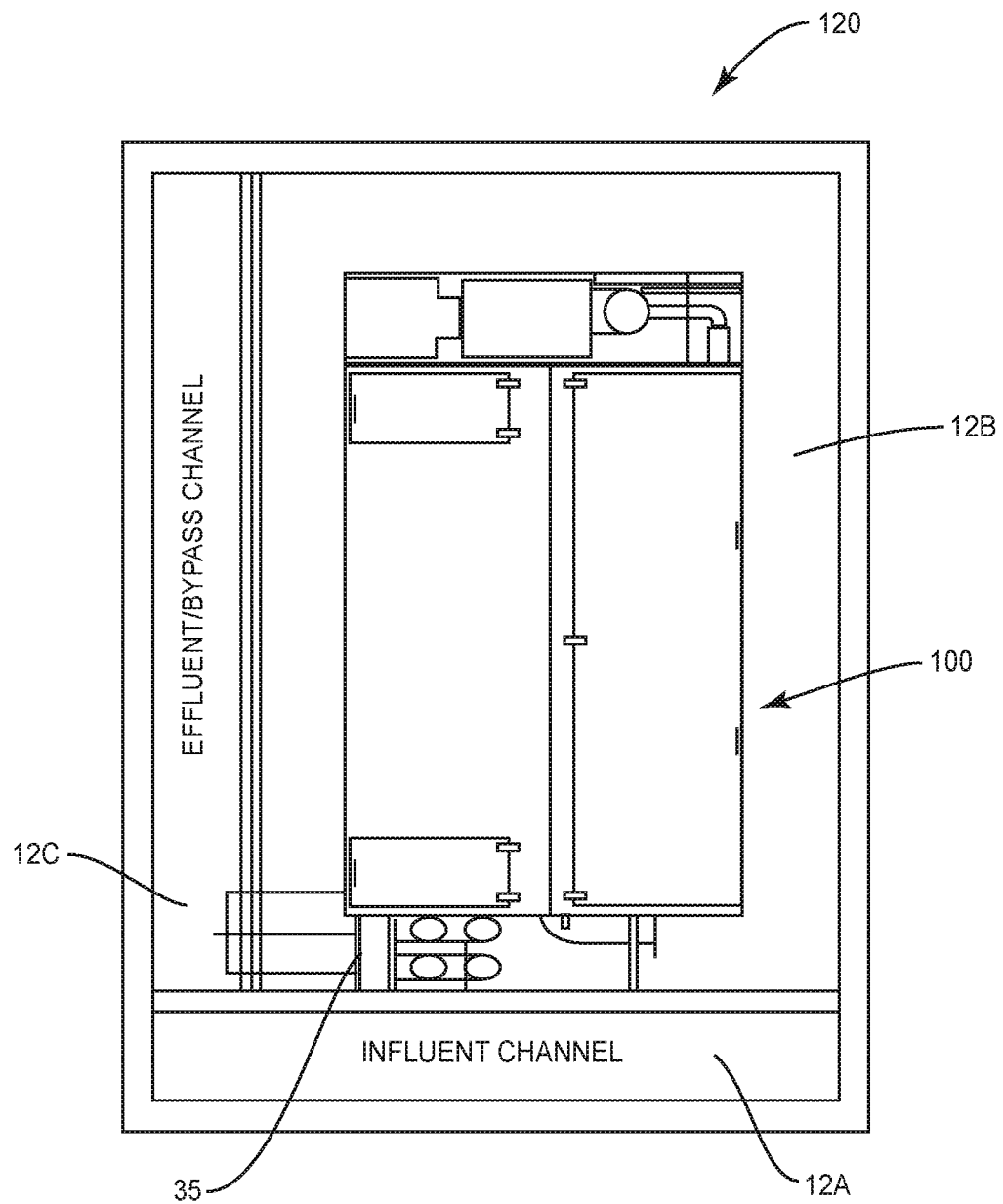
FIG. 6 is a schematic plan view showing the frame-type disc filter supported on a support structure that includes a basin for receiving filtered water.

With further reference to the drawings, a frame-type rotary disc filter is shown therein and indicated generally by the numeral 100. See FIGS. 1 and 2. As discussed below, disc filter 100 includes a design for handling bypass water and directing the bypass water from the frame-type disc filter in such a way that the bypass water is not used to backwash the filter media of the disc filter. Before discussing this design feature relating to handling bypass water, the basic design of the frame-type disc filter 100 will be discussed, as well as a support structure 120 (FIG. 6) that is typically employed to support the disc filter and collect and discharge filtrate produced by the disc filter.

The term "frame-type" when used in conjunction with disc filter means a disc filter that does not include an integral filtrate holding tank. That is, some disc filters are referred to as tank-type, include an integral filtrate holding chamber or tank that collects and holds the filtrate. See, for example, U.S. patent application Ser. No. 14/958,001 entitled "Rotary Disc Filter", which describes and shows a tank-type disc filter. The disclosure of that application is expressly incorporated herein by reference. That is not the case here. The disc filter 100 described herein is of the frame-type.

Frame-type disc filter 100 is configured to be supported on a support structure 120. A typical support structure is constructed of concrete and pre-formed prior to the installation of the disc filter 100. As seen in the drawings, particularly FIG. 6, one example of a support structure includes a concrete structure including an influent channel 12A, a filtrate basin 12B, and an effluent/bypass channel 12C. Support structure 12 is separate from the frame-type disc filter 100. Typically the disc filter 100 is delivered and anchored into the filtrate basin 12B such that the basin forms a filtrate holding area around the lower portion of the disc filter 100.

Continuing to refer to disc filter 100, it is seen from the drawings that the same includes an open frame assembly indicated generally by the numeral 12. Again, note that when installed the frame assembly 12 is anchored in the basin 12B. A rotary drum 14 is rotatively mounted in the frame structure 12. Generally, the drum 14 is closed except that it includes an inlet opening formed on the inlet end of the disc filter 100. A series of openings 14A formed in the surface of the drum permits influent water to flow from the drum into a series of disc-shaped filter members, indicated generally by the numeral 16, which are mounted on the drum. That is, as will be appreciated from discussions below, influent water is directed into the drum and from the drum the water flows through openings 14A into the respective disc-shaped filter members 16.

The number of filter discs 16 secured on the drum 14 can vary. Each filter disc 16 includes a filter frame 18 and filter media 20 secured on opposite sides thereof. See FIG. 2. A holding area is defined inside each filter disc 16 for receiving and holding water to be filtered by the disc filter 100. Head pressure associated with the influent water is effective to cause water to flow outwardly from the filter discs 16 and through the filter media 20. Water exiting the filter discs 16 is referred to as filtered water or filtrate. This results in suspended solids in the water being captured on the interior surfaces of the filter media 20. As discussed below, a backwashing system is employed to dislodge the suspended solids from the filter media 20 and the suspended solids fall into a trough disposed in the drum after which the suspended solids and some backwash are discharged from the inlet end of the disc filter 100 via a sludge outlet 26. See FIG. 1. Filtered water emitted by the filter discs 16 falls into the basin 12B that underlies the filter discs 16. The filtered water accumulates in basin 12B and rises to a height where the lower portions of the filter discs 16 are submerged in the filtered water. There is a weir or wall that separates the basin 12B from the effluent/bypass channel 12C. This wall or weir is provided at a selected height such that the filtered water in basin 12B overflows into the effluent/bypass channel 12C that discharges or directs the filtered water from the basin 12B and the disc filter 100.

Disc filter 100 is provided with a drive system for rotatively driving the drum 14 and the filter discs 16 mounted thereon. Mounted adjacent the back end of the disc filter 100 is a drum motor 30 that is operative to drive a sprocket or sheave that in turn is operative to rotate the drum 14. See FIG. 2. Various means can be operatively interconnected between the drum motor 30 and the sprocket or sheave for rotating the drum 14. That is, various drive systems can be utilized to rotate the drum and the filter disc 16. In one example, a chain drive can be utilized to drive a sprocket that directly or indirectly rotates the drum 14. Various other types of drive systems can be utilized to rotate the drum and the filter discs 16. As is appreciated by people skilled in the art, the purpose underlying the rotation of the filter discs 16 is to accommodate a backwashing process. In a typical application, the filter discs are rotated and a backwashing operation is performed about a selected upper portion of the filter discs. Thus, by continuously rotating the filter disc or incrementally rotating the filter disc, a backwashing operation can be carried out and the entire filter media 20 of the respective filter discs 16 can be cleaned through a backwashing operation.

Disc filter 100 is provided with an inlet for directing influent water into the disc filter. The influent inlet in one example includes a water holding tank 32 that is disposed adjacent the inlet of drum 14. In particular, the water holding tank 32 is disposed between the inlet to the drum and the influent channel 12A formed in the support structure 120. Thus, it is appreciated that influent water to be filtered in the case of this frame-type disc filter is received in the influent channel 12A and from there is directed into the water holding tank 32, and from the water holding tank into the drum 14. Although not shown, there is a sealed relationship between the water holding tank 32 and the drum 14.

Figure 4:
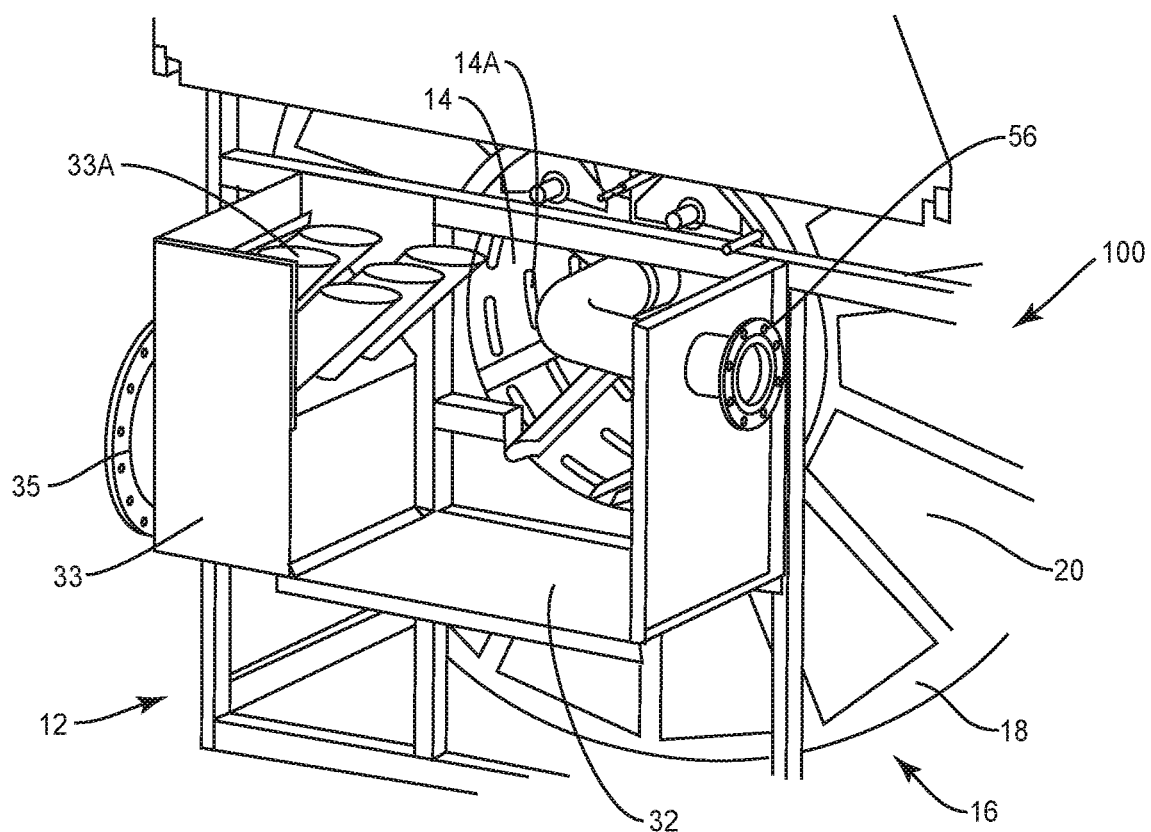
FIG. 4 is a fragmentary perspective view showing a portion of the inlet end of the frame-type disc filter and particularly showing the inlet and the bypass water collector.
Figure 5:
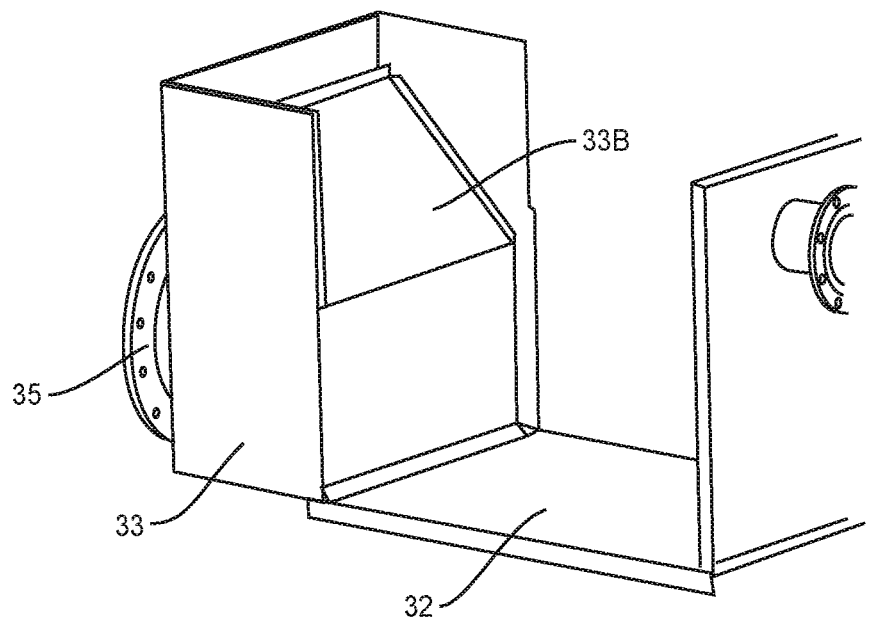
FIG. 5 is a fragmentary perspective view showing an alternate design for the bypass water collector.

To control the height of the water in the drum 14, there is provided an internal weir bypass that is incorporated into the water holding tank 32. FIGS. 4 and 5 illustrate two examples of an internal weir bypass. In both cases, a bypass water collector 33 is incorporated into the water holding tank 32. It is appreciated, however, that the bypass water collector 33 can be located outside of the water holding tank 32. First, referring to the FIG. 4 design, it is seen that the bypass water collector 33 includes a compartment disposed on the left side of the water holding tank 32. Secured about the top of the bypass water collector 33 is a series of pipes 33A that are open at the top. Once the level of influent water in the water holding tank 32 reaches a certain height, the influent water overflows into the pipes 33A and flows down into the bypass water collector 33. The second example is shown in FIG. 5. In this example, the bypass water collector includes an inclined top 33B. The inclined top 33B includes a terminal edge that terminates short of an adjacent end wall of the water holding tank 32. This forms a small space between the inclined top 33B and the end wall. In other words, this effectively forms a weir that permits influent water to flow over the weir and downwardly into the bypass water collector 33. The design shown in FIG. 4 may be more appropriate where one anticipates relatively large flows of bypass water. The design of FIG. 5 may be more appropriate when the flows of bypass water are relatively small.

A bypass water outlet 35 is communicatively connected to the bypass water collector 33. Bypass water outlet 35 can include various means such as a conduit, pipe, etc. for directing the bypass water from the bypass water collector 33. Bypass water collector 33 and the bypass water outlet 35 are configured such that they form an actual part of the disc filter 100 and are designed to prevent the bypass water from being mixed with the filtrate such that suspended solids in the bypass water become a part of the backwash employed to clean the filter media 20. Bypass water outlet 35 can assume various forms. In the drawings, the outlet 35 includes a stub conduit having a flange. To deliver bypass water to the effluent channel 12C, an additional conduit or pipe can be connected to the stub conduit. See FIG. 6, for example, showing a design that permits the bypass water to be directed from the bypass water collector 33 into the effluent channel 12C.

As discussed briefly before, disc filter 100 is provided with a backwashing system for backwashing the filter media 20. Details of the backwashing system will not be dealt with herein because backwashing systems are well known and appreciated by those skilled in the art. The exemplary backwashing system shown in the drawings includes a backwash pump 60 mounted on the back of the disc filter 100. Backwashing pump 60 is operative to pump filtrate from the basin 12B to a manifold that extends along one side of the disc filter 100. A series of feed tubes 64 branch off from the manifold and extend inwardly to where the outer terminal end portions of the feed tubes include nozzles 66. In a backwashing mode, nozzles 66 are disposed adjacent opposite sides of the filter discs 16 and in conventional fashion are operative to spray a pressurized backwash onto the exterior surfaces of the filter media 20. As eluded to before, the pressurized backwash causes suspended solids captured on the interior of surfaces of the filter media 20 to fall into a trough that is disposed within the drum 14. These suspended solids are discharged as sludge via the sludge outlet 26 which happens to extend from the side wall of the water holding tank 32.

There are advantages to the disc filter 100 discussed above. The backwash pump 60 and the nozzles 66 are always protected against bypass water entering the backwash system. This eliminates the trouble and expense of maintenance when the disc filter is yielding bypass water. In addition, there is no need for additional piping or an additional concrete channel for handling bypass water which can be costly. With the present design, there is a provision for collecting the bypass that is integral with the disc filter 100 and at the same time the provisions for collecting and discharging the bypass water are strategically located on the disc filter 100 such that the bypass water can be easily discharged into an existing effluent channel.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

What is claimed is:

1. A method of filtering water with a frame-type disc filter comprising:
    directing the water to be filtered into a water holding tank disposed adjacent an inlet end of a rotating drum where the water holding tank and the rotating drum form an integral part of the frame-type disc filter;
    directing the water to be treated from the water holding tank into the drum and through openings in the drum into a series of disc-shaped filter members mounted on the drum where the disc-shaped filter members include filter media secured on opposite sides of the disc-shaped filter members;
    causing the water to be filtered to pass through the filter media, producing filtrate;
    receiving and supporting said frame-type disc filter in an underlying support structure that includes an integral filtrate basin and a separate and integral effluent channel formed in the underlying support structure;
    collecting the filtrate produced by the frame-type disc filter in the underlying filtrate basin formed in the support structure;
    overflowing the filtrate from the basin in the support structure into the effluent channel extending adjacent the filtrate basin in the support structure;
    backwashing the filter media by pumping filtrate from the basin formed in the support structure to a series of nozzles disposed adjacent the filter media and spraying the filter media with the filtrate;
    diverting at least a portion of the water to be treated from the drum and from the disc-shaped filter members to form bypass water;
    directing the bypass water from the water holding tank to a bypass water collector that forms an integral part of the frame-type disc filter;
    directing the bypass water from the bypass water collector into the effluent channel formed in the support structure;
    mixing the bypass water with the filtrate in the effluent channel formed in the support structure; and
    discharging the mixture of bypass water and filtrate from the effluent channel formed in the support structure that underlies the frame-type disc filter.

2. A method of filtering water with a frame-type disc filter comprising:
    directing the water to be filtered into a water holding tank disposed adjacent an inlet end of a rotating drum where the water holding tank and the rotating drum form an integral part of the frame-type disc filter;
    directing the water to be treated from the water holding tank into the drum and through openings in the drum into a series of disc-shaped filter members mounted on the drum where the disc-shaped filter members include filter media secured on opposite sides of the disc-shaped filter members;
    causing the water to be filtered to pass through the filter media, producing filtrate;
    receiving and supporting said frame-type disc filter in an underlying concrete support structure that includes an integral filtrate basin and a separate and integral elongated effluent channel formed in the underlying support structure and which is separated from the filtrate basin by a weir, and wherein the elongated effluent channel is offset with respect to the filtrate basin and the frame-type disc filter supported in the support structure;
    collecting the filtrate produced by the frame-type disc filter in the underlying filtrate basin formed in the support structure;
    overflowing the filtrate from the basin in the support structure over the weir in the support structure into the effluent channel extending adjacent the filtrate basin in the support structure;
    backwashing the filter media by pumping filtrate from the basin formed in the support structure to a series of nozzles disposed adjacent the filter media and spraying the filter media with the filtrate;
    diverting at least a portion of the water to be treated from the drum and from the disc-shaped filter members to form bypass water;
    directing the bypass water from the water holding tank to a bypass water collector that forms an integral part of the frame-type disc filter and which is disposed on an inlet end of the frame-type disc filter adjacent the water holding tank;
    directing the bypass water from the bypass water collector into the effluent channel formed in the support structure and wherein this step includes directing the bypass water into a laterally extending conduit that is communicatively connected to the bypass water collector and which extends laterally out from the bypass water collector and includes a terminal end that is disposed over the effluent channel formed in the support structure such that the bypass water falls from the laterally extending conduit into the effluent channel;

mixing the bypass water with the filtrate in the effluent channel formed in the support structure; and discharging the mixture of bypass water and filtrate from the effluent channel formed in the support structure that underlies the frame-type disc filter.

3. A frame-type disc filter configured to be received and supported on a separate support structure that underlies the frame-type disc filter and wherein the support structure includes an integral filtrate basin formed therein and a separate and integral effluent channel formed in the support structure which extends adjacent the filtrate basin; comprising:

a frame structure configured to supported on the support structure;

a rotary drum supported on the frame structure for receiving water to be filtered and having a plurality of openings for permitting water to flow from the drum;

an inlet for directing water into the drum;

a drive for rotatively driving the drum;

a series of disc-shaped filter members secured around the drum for receiving water to be filtered from the drum;

filter media disposed on opposite sides of each disc-shaped filter member for filtering the water as the water flows from the disc-shaped filter members outwardly through the filter media to yield filtrate;

and wherein the disc-shaped filter members are configured to overlie the filtrate basin formed in the support structure such that the filtrate falls by gravity into the filtrate basin formed in the underlying support structure;

a backwash system incorporated into the frame-type disc filter and configured to pump filtrate from the filtrate basin formed in the support structure through a series of nozzles disposed adjacent the filter media for backwashing the filtered media;

the frame-type disc filter not including an integral filtrate holding tank for receiving and holding the filtrate;

a bypass water collector disposed on an inlet end of the frame-type disc filter and integral therewith for receiving and holding bypass water;

a bypass outlet connected to the bypass collector and extending therefrom, and wherein the bypass outlet is configured to direct bypass water from the bypass collector into the effluent channel formed in the support structure and which extends adjacent the filtrate basin; and wherein the filtrate in the filtrate basin overflows into the effluent channel and mixes with the bypass water therein and wherein the mixture of bypass water and filtrate is discharged from the effluent channel.

4. A frame-type disc filter configured to be received and supported on a separate support structure that underlies the frame-type disc filter and wherein the support structure includes an integral filtrate basin formed therein and a separate and integral effluent channel formed in the support structure which extends adjacent the filtrate basin; comprising:

a frame structure configured to supported on the support structure;

a rotary drum supported on the frame structure for receiving water to be filtered and having a plurality of openings for permitting water to flow from the drum;

an inlet including a water holding tank for directing water into the drum;

a drive for rotatively driving the drum;

a series of disc-shaped filter members secured around the drum for receiving water to be filtered from the drum;

filter media disposed on opposite sides of each disc-shaped filter member for filtering the water as the water flows from the disc-shaped filter members outwardly through the filter media to yield filtrate;

and wherein the disc-shaped filter members are configured to overlie the filtrate basin formed in the support structure such that the filtrate falls by gravity into the filtrate basin formed in the underlying support structure;

a backwash system incorporated into the frame-type disc filter and configured to pump filtrate from the filtrate basin formed in the support structure through a series of nozzles disposed adjacent the filter media for backwashing the filtered media;

the frame-type disc filter not including an integral filtrate holding tank for receiving and holding the filtrate;

a bypass water collector disposed on an inlet end of the frame-type disc filter and integral therewith for receiving and holding bypass water, the bypass water collector including a surrounding wall structure and an inclined top panel that extends over the top of the bypass water collector and includes an edge that terminates short of the surrounding wall structure to define a bypass collector inlet between an edge of the inclined top panel and said portion of the surrounding wall structure, and where in the inclined top panel closes the bypass water collector except for the bypass collector inlet which receives bypass water from said water holding tank;

a bypass outlet connected to the bypass collector and extending therefrom, and wherein the bypass outlet is configured to direct bypass water from the bypass collector into the effluent channel formed in the support structure and which extends adjacent the filtrate basin; and wherein the filtrate in the filtrate basin overflows into the effluent channel and mixes with the bypass water therein and wherein the mixture of bypass water and filtrate is discharged from the effluent channel.

* * * * *